United States Patent [19]

Watanabe

[11] 4,409,622

[45] Oct. 11, 1983

[54] METHOD OF SKIPPING ALL-WHITE BLOCKS BY INTERPOSING A WHITE SIGNAL PIECE BETWEEN TWO ADJACENT BLOCKS WHICH ARE NOT CONSECUTIVE IN AN ORIGINAL FACSIMILE SIGNAL

[75] Inventor: Hideaki Watanabe, Tokyo, Japan

[73] Assignee: Nippon Electric Co., Ltd., Tokyo, Japan

[21] Appl. No.: 318,950

[22] Filed: Nov. 6, 1981

[30] Foreign Application Priority Data

Nov. 11, 1980 [JP] Japan ................................ 55-158710

[51] Int. Cl.³ .......................... H04N 1/40; H04N 7/12
[52] U.S. Cl. ..................................... 358/260; 358/288
[58] Field of Search ................................. 358/260, 288

[56] References Cited

U.S. PATENT DOCUMENTS 3,643,016  2/1972  Dattilo ................................. 358/288
4,225,888  9/1980  Takayama ............................ 358/288
4,301,479  11/1981  Fukinuki ............................. 358/260

FOREIGN PATENT DOCUMENTS 1379814  10/1963  France .
2369760  10/1977  France .

Primary Examiner—Howard Britton
Attorney, Agent, or Firm—Laff, Whitesel, Conte & Saret

[57] ABSTRACT

For each line of scan of an original text, a compressed facsimile signal for transmission, particularly through analog modems, comprises a phase synchronizing signal (S), a control flag signal (F), and a graphic signal section (P) which comprises a succession of signal blocks ($P_2$–$P_5$, $P_8$) representative of graphic blocks comprising black areas on the original text with signal block representative of graphic blocks, each consisting of a white area, deleted from the succession. A white signal piece ($W_1$) of a preselected duration is interposed between two adjacent signal blocks in the succession only when the two adjacent signal blocks do not represent the graphic blocks which are continuous also on the original text. The preselected duration is preferably of the duration of each control flag ($f_1$–$f_{10}$) in the control flag signal.

5 Claims, 6 Drawing Figures

METHOD OF SKIPPING ALL-WHITE BLOCKS BY INTERPOSING A WHITE SIGNAL PIECE BETWEEN TWO ADJACENT BLOCKS WHICH ARE NOT CONSECUTIVE IN AN ORIGINAL FACSIMILE SIGNAL

BACKGROUND OF THE INVENTION

This invention relates to a method of deriving a compressed facsimile signal from an original facsimile signal according to an all-white block skipping scheme. This invention is specifically adapted to a facsimile transmission system comprising analog modems.

It is well known that an original facsimile signal derived from an original text has redundant graphic or picture information. An excellent method of compressing the redundant information for digital transmission, is to resort to the run length encoding as called in the art. When the information-compressed signal is to be transmitted through a telephone line, digital modems are used for transmission at a rate of, for example, 4,800 or 9,600 bauds. Should an error occur even at a bit of the run length encoded signal during transmission from a transmitting end to a receiving end, serious degradation is inevitable on the text reproduced at the receiving end. The digital modems must therefore be highly reliable and are consequently expensive.

For analog transmission of facsimile signals, compression of graphic information is usually carried out by an all-white block skipping scheme or technique. According to the scheme, all white areas of the original text are skip-scanned in effect. As will later be described with reference to a few of several figures of the accompanying drawing. It has been impossible to obtain an excellent reproduced text by conventional all-white block skipping schemes. Even with an improved scheme, it has been impossible to insure continuity of black areas on the reproduced text. Furthermore, it has been infeasible to transmit the all-white block skipped facsimile signal through a carrier transmission line comprising a plurality of links because of such degradation in the continuity of black and/or white areas on the reproduced text.

SUMMARY OF THE INVENTION

It is therefore an object of the present invention to provide a method of compressing graphic information of an original facsimile signal according to an all-white block skipping scheme, by which method it is possible to obtain a reproduced text of an astonishingly excellent quality.

It is another object of this invention to provide a method of the type described, by which it is possible to insure continuity of black and white areas on the reproduced text.

It is yet another object of this invention to provide a method of the type described, with which it is rendered possible to transmit an information-compressed facsimile signal through a carrier transmission line comprising up to about six links.

It is a further object of this invention to provide a method of the type described, which is suitable for analog transmission of the information-compressed facsimile signal.

It is possible to specify a method to which this invention is applicable, as a method of compressing graphic information of an original facsimile signal comprising black and white signal elements representative, respectively, of black and white areas arranged along a line of scan on an original text, which method includes the steps of dividing the original facsimile signal into a plurality of signal blocks corresponding to graphic blocks on the original text and having predetermined durations, respectively, of producing control flags for the respective signal blocks for use in discriminating a signal block consisting of a white signal element from a signal block comprising a black signal element, and of producing a compressed facsimile signal comprising the control flags and a succession of the signal blocks comprising black signal elements with the blocks consisting of white signal elements deleted from the succession. According to this invention, the above-specified method comprises the step of interposing a white signal piece of a preselected duration between two adjacent signal blocks in the succession only when the said two adjacent signal blocks do not correspond to the graphic blocks which are continuous on the original text.

The original text may bear letters and/or at least one picture thereon and may be any one of the texts adapted to facsimile transmission. As is usual in the art, the black and white signal elements are representative of graphic information and information relating to the background, respectively, and may represent white and black areas, respectively, of the original text. The original facsimile signal may include signal elements representative of various halftone areas on the original text.

DESCRIPTION OF THE PREFERRED EMBODIMENTS

Figure 2:
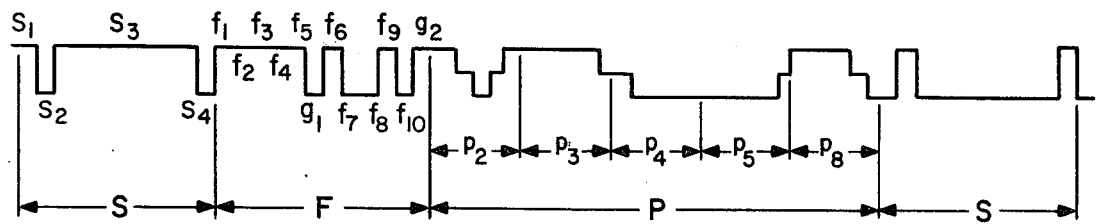
FIG. 2 shows a compressed facsimile signal derived from the original text by resorting to a conventional all-white block skipping scheme.
Figure 1:
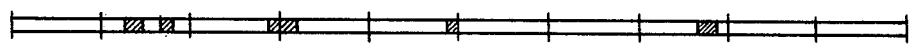
FIG. 1, drawn below FIG. 3 for convenience of reference, schematically exemplifies black and white areas on an original text along a line of scan.

Referring to FIGS. 1 and 2, a conventional all-white block skipping scheme will be described at first in order to facilitate an understanding of the present invention. It will be presumed merely for simplicity of description that an original text has black and white areas along a line of scan as exemplified in FIG. 1 and that a facsimile signal derived from the original text is transmitted through analog modems. The black areas are indicated by hatched areas. As is well known in the art, an original facsimile signal (not shown) derived from the original text comprises black and white signal elements. The black signal elements are representative of the black areas, respectively. The white signal elements are representative of the respective white areas. In accordance with the scheme, the original facsimile signal is divided into a plurality of signal blocks of predetermined durations, respectively. It will furthermore be assumed that the signal blocks have a common duration and ten in number. In other words, the signal blocks consist of first through tenth signal blocks. The signal blocks correspond to graphic blocks on the original text, respectively. The graphic blocks corresponding to the first through the tenth signal blocks will be called first through tenth graphic blocks, respectively. Each graphic block has a leading and a trailing edge along the line of scan as indicated by thin vertical lines. Each signal block has a leading and a trailing edge corresponding to the leading and the trailing edges of the corresponding graphic block, respectively. The leading edge of each block is coincident with the trailing edge of a next preceding block.

Inasmuch as phase synchronism must be established, as will later be discussed in detail, between a transmitting and a receiving end of a compressed facsimile signal derived from the original facsimile signal, the compressed facsimile signal comprises a phase synchronizing signal S to be presently described. First through tenth control flags $f_1$, $f_2$, $f_3$, $f_4$, $f_5$, $f_6$, $f_7$, $f_8$, $f_9$, and $f_{10}$ are produced from the original facsimile signal for the first through the tenth signal blocks, respectively, as will shortly be described. The control flags $f_1$ through $f_{10}$ are for use in discriminating a signal block consisting of a white signal element, namely, an all-white signal block, from a signal block comprising a black signal element. In the example being illustrated, the first, sixth, seventh, ninth, and tenth graphic blocks are all-white graphic blocks consisting of white areas. The signal blocks bearing the same ordinal numbers are all-white signal blocks. The second through fifth and the eighth graphic blocks comprise black areas and consequently are graphic blocks comprising black areas. The signal blocks for such graphic blocks are the signal blocks comprising black signal elements. The control flags $f_1$ through $f_{10}$ are successively arranged as a control flag signal F with first and second guard bands $g_1$ and $g_2$ interposed as will become clear as the description proceeds.

In the compressed facsimile signal, the all-white signal blocks are deleted or suppressed. The compressed facsimile signal therefore comprises a succession, or a graphic or picture signal section P, of the second through fifth and the eighth signal blocks depicted at $p_2$, $p_3$, $p_4$, $p_5$, and $p_8$, respectively. The all-white signal blocks, which may be designated by $p_1$, $p_6$, $p_7$, $p_9$, and $p_{10}$ (not shown), are deleted from the succession.

Such a compressed facsimile signal is usually transmitted from a transmitting end to one or more receiving ends by resorting to the AM—PM—VSB transmission technique, which provides a better performance of transmission than the mere AM transmission technique. According to the AM—PM—VSB transmission technique, the white signal elements are transmitted as mark signals with the phase reversed, as indicated at a top and a bottom level, when intervened by a black signal element. More specifically, the carrier signal is transmitted with a certain phase at the leading end, namely, at and near the leading edge, of the second signal block $p_2$. The carrier signal is given a reversed phase between two successive black signal elements, depicted by an intermediate level, in the second signal block $p_2$. The graphic signal section P is thus a three-level baseband signal.

The compressed facsimile signal has a signal format according to which the phase synchronizing signal S, the control flag signal F, and the graphic signal section P are consecutively transmitted for each line of scan. In order to describe the phase synchronizing and the control flag signals S and F more in detail, a unit will be defined by the duration of each control flag. The units are transmitted at a rate several times slower than the highest rate of transmission of the graphic signal section P, namely, at a rate between about 1,000 and 1,600 bauds. The unit thus has a duration between about 0.6 and 1.0 millisecond. In the illustrated example, each signal block is five units long.

The phase synchronizing signal S is eleven units long and consists of a first synchronizing element $s_1$ having a one-unit duration and a phase of the last white signal element in the graphic signal section for the next previous line of scan, a second synchronizing element $s_2$ having the one-unit duration and a phase reversed at its leading edge relative to the phase of the first synchronizing element $s_1$, a third synchronizing element $s_3$ having an eight-unit duration and a phase reversed at the leading edge, and a fourth synchronizing element $s_4$ that is one unit long and has a phase similarly reversed at the leading edge. As will later be discussed, the phase synchronizing signal S has a format that will never appear in the control flag signal F and seldom appears in the graphic signal section P. Inasmuch as the original facsimile signal comprises a white signal element at the end of each scan, the first synchronizing element $s_1$ has either of two phases.

At the receiving end, the phase synchronizing signal S is detected by sensing the second and the third synchronizing elements $s_2$ and $s_3$. The phase synchronization is carried out with reference to the phase reversal at the leading edge of the fourth synchronizing element $s_4$.

The control flag signal F is twelve units long. Each of the control flags $f_1$ through $f_{10}$ and the guard bands $g_1$ and $g_2$ is one unit long. The first and the second guard bands $g_1$ and $g_2$ are interposed in the control flag signal F between the fifth and sixth control flags $f_5$ and $f_6$ and immediately following the tenth control flag $f_{10}$, respectively. The guard bands $g_1$ and $g_2$ are given a phase reversed relative to the phase of the next preceding control flags $f_5$ and $f_{10}$. The phase which the next previous units of the fourth synchronizing element $s_4$, the control flags $f_1$ through $f_{10}$, and the guard bands $g_1$ and $g_2$ have, will be named a reference phase.

The control flag or flags are given a phase reversed relative to the reference phase only when the signal block thereby represented is an all-white signal block. The first, sixth, seventh, ninth, and tenth control flags $f_1$, $f_6$, $f_7$, $f_9$, and $f_{10}$ therefore have reversed phases. The second through fifth and the eighth control flags $f_2$ to $f_5$ and $f_8$ have the reference phases. The guard bands $g_1$ and $g_2$ are for preventing the control flag signal F from being given a phase lasting five units or more. It is thereby rendered feasible to discriminate the phase synchronizing signal S from the control flag signal F.

The graphic signal section P seldom has the format of the phase synchronizing signal S. Even when a part of the graphic signal section P happens to have the format in question, the phase synchronizing signal S is readily distinguished from such a part because the positions of the phase synchronizing signals S's for the respective lines of scan, are predicted from the control flags in the next previous line of scan once the phase synchronism is established at the beginning of each reproduced text. Even when the phase synchronism is upset by an instantaneous break in the transmission line, pulsed noise superimposed on the compressed facsimile signal, and others, the probability that such a part of the graphic signal section P appears immediately after the upset, is very small.

Although the phase synchronizing signal S is thus clearly discriminated from other signal sections of the compressed facsimile signal at the receiving end, the leading edge of the fourth synchronizing element $s_4$ is capable of defining a reference phase at a precision of a few scores of microseconds at best. The precision is deteriorated when performance of the transmission line is adversely affected for some reason or another. A phase shift of a certain amount is therefore unavoidable between the phases of the compressed facsimile signal transmitted at the transmitting end and received at the receiving end. The phase shift may result in mistreatment of a white signal element as a black signal element and vice versa. For example, the white signal element at the leading end of the eighth signal block $p_8$ may be recorded as a black area represented by the black signal element at the trailing end of the next preceding signal block, namely, the fifth signal block $p_5$.

Furthermore, interference may occur between two adjacent signal elements during transmission even when there is no phase shift at all between the transmitting and the receiving ends. A similar effect results from ringing, which is inevitable when the compressed facsimile signal is transmitted through a carrier transmission line comprising a link. By way of example, the leading end of the eighth signal block $p_8$ may suffer from the interference of the trailing end of the fifth signal block $p_5$.

The results of the phase shift, interference, and ringing are such that a black area is undesirably recorded on the reproduced text at the leading end of the eighth graphic block and consequently between the seventh and the eighth graphic blocks where a white area should be continuous in fact. This means that the conventional all-white block skipping scheme is incapable of always providing excellent reproduced texts. The continuity of a white area is not always insured between two consecutive graphic blocks on the reproduced text.

Figure 3:
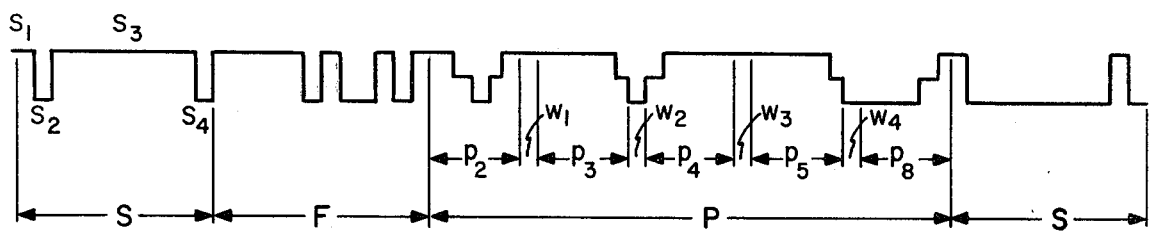
FIG. 3 shows another compressed facsimile signal derived from the original text according to an improved all-white block skipping scheme known in the art.

Turning to FIG. 3, another signal format according to an improved conventional all-white block skipping scheme is similar to that illustrated with reference to FIG. 2 insofar as the phase synchronizing and the control flag signals S and F are concerned. In accordance with the improved signal format, a white signal piece of a one-unit duration is interposed in the graphic signal section P between each pair of two adjacent signal blocks. More specifically, first through fourth white signal pieces $w_1$, $w_2$, $w_3$, and $w_4$ are inserted between the second and third signal blocks $p_2$ and $p_3$, between the third and fourth signal blocks $p_3$ and $p_4$, between the fourth and fifth signal blocks $p_4$ and $p_5$, and between the fifth and eighth signal blocks $p_5$ and $p_8$, respectively. Each white signal piece serve as a guard band.

It is possible with the improved signal format to avoid misrecord of a continuous white area between the seventh and eighth graphic blocks on the reproduced text as including a black area. The continuity of a black area between the third and the fourth graphic blocks on the original text might, however, be adversely affected on the reproduced text. For example, a phase shift of a certain amount between the phases at the transmitting and the receiving ends, results either in mistreatment of the trailing end of the second white signal piece $w_2$ on the reproduced text as the leading end of the fourth signal block $p_4$ or the leading end of the second white signal piece $w_2$ as the trailing end of the third signal block $p_3$. In either event, a white area is misrecorded appreciably conspicuously at an interface between the third and fourth graphic blocks of the reproduced text where a black area should be continuously recorded. Misrecord of a similar white area likewise takes place as a result of interference and/or ringing. Consequently, the continuity is not much improved even with the "improved" signal format.

Figure 4:
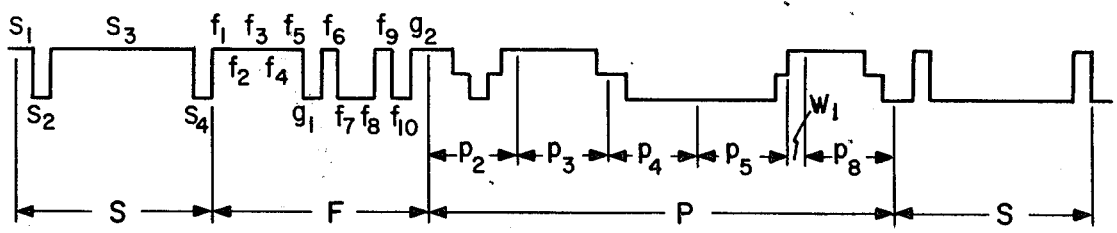
FIG. 4 shows a compressed facsimile signal derived from the original text by resorting to a method according to an embodiment of the instant invention.

Referring now to FIG. 4, a signal format resorted to by a method according to an embodiment of this invention is similar to those depicted in FIGS. 2 and 3 so long as the phase synchronizing and the control flag signals S and F are concerned. A white signal piece, such as $W_1$, of a preselected duration, such as a one-unit duration, is interposed in the graphic signal section P between two adjacent signal blocks only when the two adjacent signal blocks do not correspond to the graphic blocks which are consecutive on the original text. As exemplified in FIGS. 3 and 4, a novel white signal piece $W_1$ (FIG. 4) is different from conventional white signal pieces $w_2$ and $w_4$ (FIG. 3). In contrast to conventional white signal pieces $w_1$ and $w_3$, each novel white signal piece $W_1$ is given the amplitude of the white signal elements and a phase reversed from the phase of the white signal element nearest to the trailing edge of the preceding all-white signal block, but only when the preceding all-white signal block comprises a black signal element at the trailing edge. In the illustrated example, the second through fifth signal blocks $p_2$ to $p_5$ correspond to the second through fifth graphic blocks (FIG. 1) which are continuous also on the original text. No white signal pieces are therefore interposed between these signal blocks $p_2$ through $p_5$. On the contrary, the fifth and eighth signal blocks $p_5$ and $p_8$ are two adjacent signal blocks and correspond to the fifth and eighth graphic blocks which are not continuous on the original text. A white signal piece $W_1$ is therefore interposed between the fifth and eighth signal blocks $p_5$ and $p_8$. It is quite unexpected that the continuity of white and/or black areas is insured on the reproduced text between any two adjacent graphic blocks as on a text reproduced directly from the original facsimile signal.

Consideration will now be given to the continuity on the text reproduced from the fifth and eighth signal blocks $p_5$ and $p_8$ which are two adjacent signal blocks in the compressed facsimile signal and do not correspond to two adjacent graphic blocks which are continuous on the original text. When a phase shift of a certain amount occurs between the phases transmitted at the transmitting end and received at the receiving end, the trailing end of the white signal piece $W_1$ may be mistreated at the receiving end as the leading end of the eighth signal block $p_8$. Inasmuch as a white area is reproduced from the white signal piece $W_1$, no black area appears at the leading end of the eighth graphic block. Alternatively, the leading end of the white signal piece $W_1$ may be mistreated as the trailing end of the fifth signal block $p_5$. On the reproduced text, a white area will be recorded at the trailing end of the fifth graphic block where the original text has a black area rather than a white area. The sixth graphic area is, however, an entirely white area. The original facsimile signal is suppressed at the signal block $p_6$ corresponding to the sixth graphic block. A white area is recorded on the reproduced text throughout the sixth graphic block. The result of mistreatment is therefore such that the black area at the trailing end of the fifth graphic block of the original text is merely shortened on the reproduced text by an amount corresponding to the phase shift. The apparent faithfulness of reproduction is not appreciably adversely affected between the fifth and sixth graphic blocks.

Attention will be directed to the effects of interference and/or ringing. When the preselected duration of the white signal piece, such as $W_1$, is about one unit long, the leading end of the eighth signal block $p_8$ is not substantially adversely affected by the white signal piece $W_1$ even when the compressed facsimile signal is caused to pass through a carrier transmission line comprising as many as six links. Likewise, the trailing ends of the fifth and seventh graphic blocks are not materially affected on the reproduced text by the white signal piece $W_1$ inserted between the fifth and eighth signal blocks $p_5$ and $p_8$.

As regards the rate of compression, it should be recalled that insertion of the white signal piece or pieces, such as $W_1$, is carried out only between two adjacent signal blocks, such as $p_5$ and $p_8$, corresponding to the graphic blocks which are not continuous on the original text. The rate of compression is therefore much excellent than the rate achieved by the "improved" signal format according to the above-described conventional all-white block skipping scheme.

Figure 5:
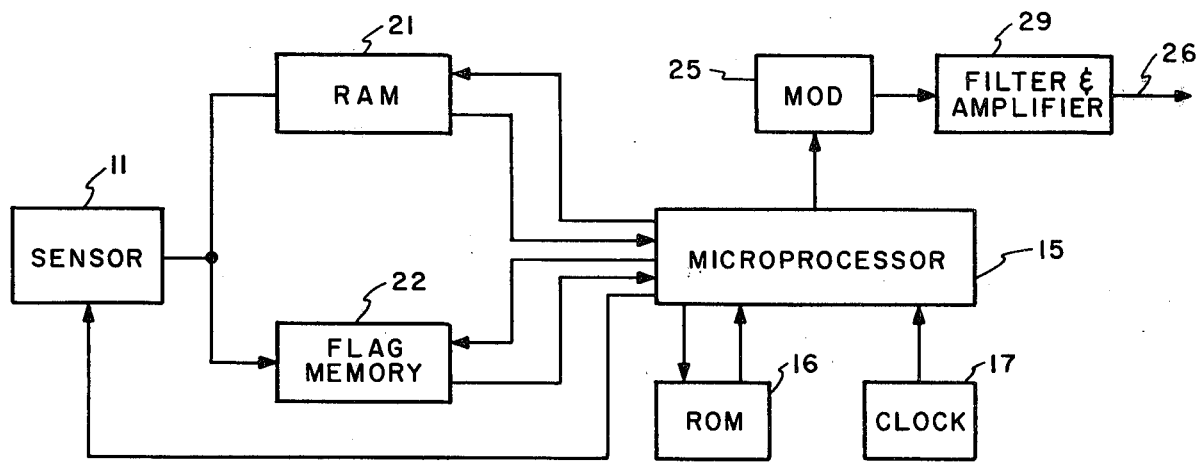
FIG. 5 is a block diagram of a facsimile transmitter for use in carrying out a method according to this invention.

Turning to FIG. 5, a facsimile transmitter for carrying out a method according to this invention is substantially the same in structure as that for putting the conventional all-white block skipping schemes into effect. The transmitter comprises a line sensor or solid-state image scanner 11 for converting an original text (FIG. 1) into an original facsimile signal along each line of scan. A microprocessor 15 is accompanied by a program read-only memory 16 and a clock generator 17. A program is preliminarily stored in the read-only memory 16 for the method according to this invention. The clock generator 17 is for generating a sequence of clock pulses at a clock period of, for example, 100 microseconds.

When put into operation by a manually or otherwise operable start-stop switch (not shown), the clock generator 17 delivers the clock pulse sequence to the microprocessor 15. Accessing the read-only memory 16 and controlled according to the program read out thereof, the microprocessor 15 drives the sensor 11. The original facsimile signal is supplied from the sensor 11 to a random-access memory 21 and also to a control flag memory 22, both controlled by the microprocessor 15. The original facsimile signal is stored in the random-access memory 15. The control flag memory 22 is capable of discriminating successive blocks of the original facsimile signal into two, an all-white signal block and a signal block comprising a black signal element, and is loaded successively with criteria, each indicative of either of the two.

An AM-PM-VSB modulator 25 includes a carrier generator for generating a carrier signal for the AM-PM-VSB modulation. In compliance with the program read out of the read-only memory 16, the microprocessor 15 makes the modulator 25 produce a phase synchronizing signal S for a line of scan. Responsive to the criteria read out of the control flag memory 22, the microprocessor 15 makes the modulator 25 produce a control flag signal F, such as the control flags $f_1$ through $f_{10}$ and the guard bands $g_1$ and $g_2$, of the scanning line under consideration. Again responsive to the criteria, the microprocessor 15 reads the signal block comprising a black signal element from the random-access memory 21 and makes the modulator 25 produce a graphic signal section P for that scanning line with the white signal piece or pieces, such as $W_1$, interposed in the graphic signal section P according to the program. Likewise controlled by the microprocessor 15, the modulator 25 subsequently produces the phase synchronizing signal S and others for the successively following lines of scan.

The modulator 25 thus produces a modulator output signal comprising the phase synchronizing signals S's, the control flag signals F's, and the graphic signal sections p's for the successive scanning lines. The modulator output signal is delivered to a transmission line 26 as a compressed facsimile signal through a block 29 comprising a filter for restricting the frequency band of the modulator output signal and an amplifier for giving a pertinent level to the compressed facsimile signal.

Figure 6:
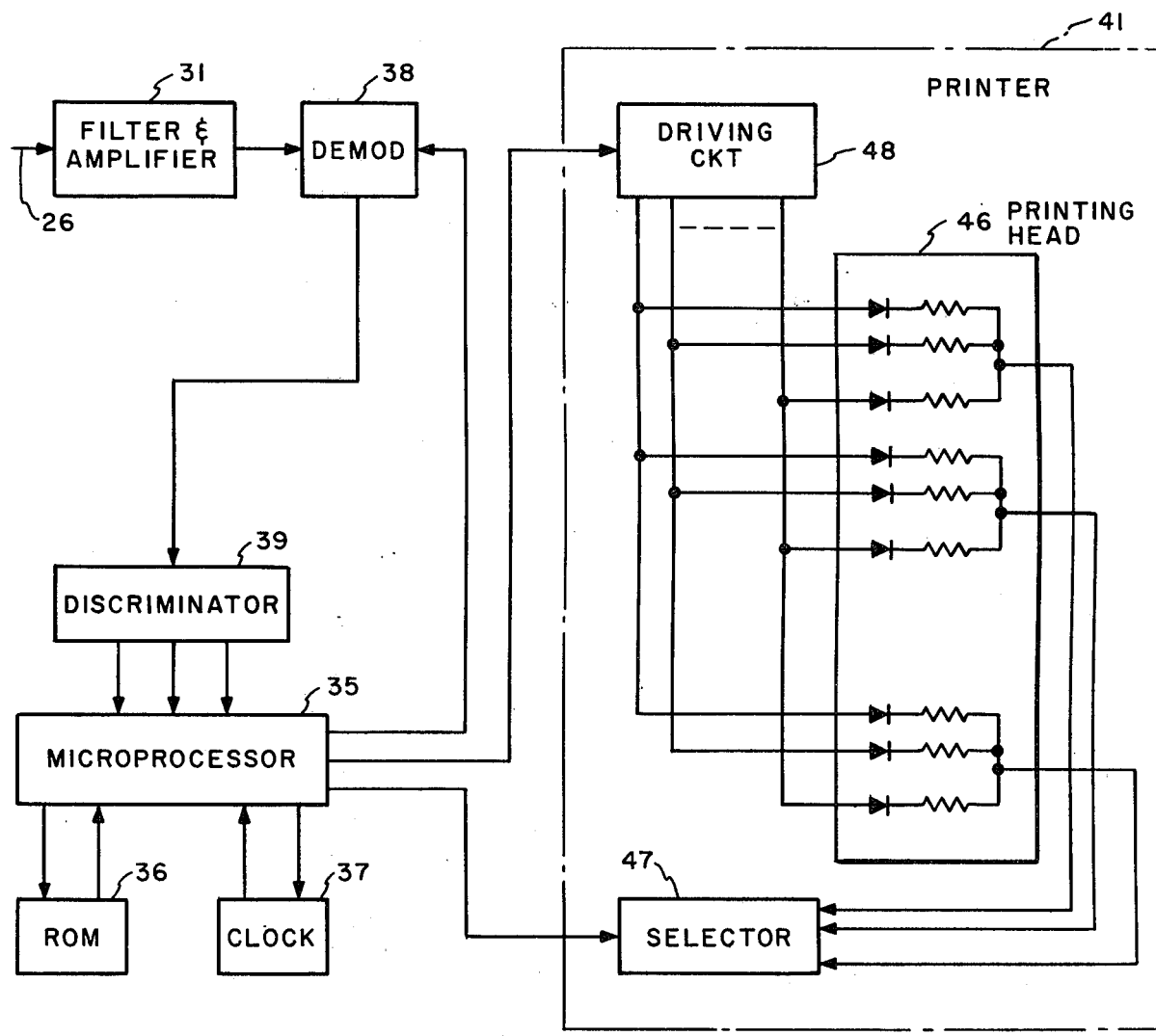
FIG. 6 is a block diagram of a facsimile receiver to be used in combination with the facsimile transmitter depicted in FIG. 5.

Finally referring to FIG. 6, a facsimile receiver to be used as a counterpart of the transmitter illustrated with reference to FIG. 5, is substantially the same in structure as that for use in combination with a facsimile transmitter for putting the conventional all-white block skipping scheme into effect. Responsive to the compressed facsimile signal delivered to the receiver through the transmission line 26 as a receiver input signal, a block 31 produces a received facsimile signal. For this purpose, the block 31 comprises a filter for restricting the frequency band of the receiver input signal and an amplifier with an AGC circuit for giving a pertinent level to the received facsimile signal.

A microprocessor 35 is accompanied by a program read-only memory 36 and a local clock generator 37. A program is preliminarily stored in the read-only memory 36 for use in converting the received facsimile signal to a reproduction of the original facsimile signal. The local clock generator 37 generates a sequence of local clock pulses substantially at the clock period of the clock pulse sequence used in the counterpart transmitter.

A demodulator 38 is for demodulating the received facsimile signal into a demodulator output signal under the control of the microprocessor 35. Supplied with the demodulator output signal, a signal discriminator 39 supplies the microprocessor 35 with the phase synchronizing signal S, the control flag signal F, and the graphic signal section P for each line of scan. Responsive to the phase synchronizing signal S, the microprocessor 35 controls the phase of the local clock pulse sequence. With reference to the control flags $f_1$ through $f_{10}$, the signal blocks, such as $p_2$ through $p_5$ and $p_8$, and the white signal piece or pieces, such as $W_1$, the microprocessor 35 delivers the reproduction of original facsimile signal to a printer section 41 for producing a reproduction of the original text.

In the example being illustrated, the printer section 41 is a known thermo-sensitive printer and comprises a thermal printing head 46 accompanied by a selector circuit 47 and a drive circuit 48. The head 46 includes thermal elements depicted by resistors and arranged in printer blocks, each comprising a plurality of the thermal elements. Responsive to the control flags $f_1$ through $f_{10}$ for each line of scan, the microprocessor 35 makes the selector circuit 47 select one of the printer blocks that corresponds to each signal block comprising a black signal element by forming a return path for an electric current to be caused to pass through one or more of the thermal elements of the selected printer block. Responsive to the signal blocks comprising black signal elements, the drive circuit 48 makes the electric current flow through the the thermal element or elements corresponding in each selected printer block to the black signal element. The reproduced text is printed on a thermo-sensitive recording medium.

While this invention has thus far been described in specific conjunction with a preferred embodiment thereof, it will now be readily feasible for one skilled in the art to carry this invention into effect in various other ways. For example, the original facsimile signal may include signal elements representative of halftone areas of the original text. In this event, the original facsimile signal may be an eight-level signal. The control flag memory 22 should be capable of discriminating an all-white signal block from the other signal blocks with reference to a predetermined threshold level. Each white signal piece, such as $W_1$, may have a duration different from the one-unit duration, such as a somewhat shorter duration preselected in consideration of the phase shift and the interference, including the effect of ringing, to which the compressed facsimile signal may possibly be subjected during transmission through the transmission line 26. A very long duration, however, adversely affects the merit of information compression.

The facsimile transmitter may be of a different structure with modulation other than the AM-PM-VSB modulation. The receiver may accordingly be modified. Although the method according to this invention is specifically adapted to a compressed facsimile signal to be transmitted through analog modems, it is possible to transmit the compressed facsimile signal through digital modems. The phase synchronizing signal S for each line of scan may be given a more complicated format in order to enable the receiving end more readily discriminate each phase synchronizing signal S from every part of the graphic signal section P's. The signal blocks for each line of scan may have different durations predetermined in compliance with the ordinal numbers, such as first through the tenth. The compressed facsimile signal may comprise the phase synchronizing signal S, the control flag signal F, and the graphic signal section P in an order different from that described heretobefore.

What is claimed is:

1. A method of compressing graphic information of an original facsimile signal comprising black and white signal elements representative, respectively, of black and white areas arranged along a line of scan on an original text, said method including the steps of dividing said original facsimile signal into a plurality of signal blocks corresponding to graphic blocks on said original text and having predetermined durations, respectively, of producing control flags for the respective signal blocks for use in discriminating a signal block consisting of a white signal element from a signal block comprising a signal element other than the white signal element, and of producing a compressed facsimile signal comprising said control flags and a succession of the signal blocks comprising the signal elements other than the white signal element with the signal blocks consisting of white signal elements deleted from said succession, wherein the improvement comprises the step of interposing a white signal piece of a preselected duration between two adjacent signal blocks in said succession only when said two adjacent signal blocks do not correspond to the graphic blocks which are continuous on said original text.

2. The method as claimed in claim 1, each control flag having a prescribed duration, wherein said preselected duration is rendered substantially equal to said prescribed duration.

3. The method as claimed in claim 2, wherein said compressed fascimile signal comprises a synchronizing signal for each line of scan, the control flags for said each scan line next following said synchronizing signal, and the signal block succession for each of said scan lines after the last-mentioned control flags with the white signal piece interposed in said signal block succession.

4. A method as claimed in claim 3, wherein the white signal elements are given a predetermined amplitude and two phases with the phase reversed only when two of the white signal elements have an intervening signal element which is other than the white signal elements, said synchronizing signal comprising a predetermined number of signal units which have been given said predetermined amplitude and said two phases according to a predetermined rule, each signal unit having said prescribed duration, said control flags being given said predetermined amplitude and said two phases with the phase of the control flag reversed only when the signal block represented by the last-mentioned control flag comprises white signal elements, said white signal piece being given said predetermined amplitude and one of said two phases that is reversed from the phase of the white signal element of a preceding one of said two adjacent signal blocks only when said preceding signal block comprises a signal element other than the white signal elements next following the last-mentioned white signal element and immediately following in said original facsimile signal by a signal block consisting of the white signal elements.

5. A method as claimed in claim 4, wherein a guard time is placed after each set of a preselected number of the control flags, said compressed signal being given at each guard time said predetermined amplitude and the phase reversed relative to that of the control flag next preceding said each guard time.

* * * * *